United States Patent [19]
Aust et al.

[11] 4,239,574
[45] Dec. 16, 1980

[54] PROCESS AND APPARATUS FOR THE WELDING OF SYNTHETIC RESIN STRUCTURES

[75] Inventors: Heinrich Aust, Hennef; Wolfgang Budich, Troisdorf-Sieglar; Heinz Nowak, Siegburg; Franz Primessing, Niederkassel-Mondorf, all of Fed. Rep. of Germany

[73] Assignee: Dynamit Nobel AG, Fed. Rep. of Germany

[21] Appl. No.: 884,239

[22] Filed: Mar. 7, 1978

Related U.S. Application Data

[63] Continuation of Ser. No. 682,199, May 3, 1976, abandoned, which is a continuation-in-part of Ser. No. 449,344, Mar. 8, 1974, abandoned.

[30] Foreign Application Priority Data

Mar. 13, 1973 [DE] Fed. Rep. of Germany ....... 2312362

[51] Int. Cl.$^2$ .............................................. B29C 27/06
[52] U.S. Cl. ................................ 156/267; 156/304.5; 156/499; 156/507
[58] Field of Search ............... 156/304, 267, 516, 518, 156/530, 391, 556, 228, 499, 502, 507, 508; 83/456

[56] References Cited

U.S. PATENT DOCUMENTS

| | | | |
|---|---|---|---|
| 1,693,636 | 12/1928 | Coe | 156/267 |
| 2,379,500 | 7/1945 | Steffens | 156/267 |
| 2,448,173 | 8/1948 | Cowan | 156/267 |
| 3,822,160 | 7/1974 | LaBarge et al. | 156/267 |
| 3,842,699 | 10/1974 | Van Zyl | 83/456 X |
| 3,897,296 | 7/1975 | Waldrum | 156/304 |

FOREIGN PATENT DOCUMENTS 842782  7/1960  United Kingdom .................... 156/304

*Primary Examiner*—Michael G. Wityshyn
*Attorney, Agent, or Firm*—Craig and Antonelli

[57] ABSTRACT

A process for welding synthetic resin structures together at their end faces, wherein the structures are clamped in position, the end faces are heated by being brought into contact with a heating plate until initial melting occurs, the softened end faces are pressed together and the weld bead is machined off, the structures are guided on at least two opposing outside surfaces up to the welding edge by guide means, with the melting zone being left vacant, and the softened end faces of the profile elements are pressed together approximately until the opposite outside guide means contact each other whereby the weld bead formation is restricted and the weld bead can be scraped off while the elements are still in the warm condition and a device for carrying out this process.

22 Claims, 10 Drawing Figures

PROCESS AND APPARATUS FOR THE WELDING OF SYNTHETIC RESIN STRUCTURES

This is a continuation of application Ser. No. 682,199, filed May 3, 1976, now abandoned, which in turn is a continuation-in-part of Ser. No. 449,344 filed Mar. 8, 1974, now abandoned.

The invention relates to a process and apparatus for the production of synthetic resin structures, e.g., profile elements that are welded together at their end faces, wherein the structures are clamped, the end faces are heated by being placed in contact with a heating plate until the resin starts to melt, and the thus-softened end faces are pressed together and the resulting weld bead is machined off.

In order to effect such a welding process, welding machines are known which comprise a clamping unit, displaceable sliding guide means, and a heating plate, wherein the profile elements to be welded together with their end faces are clamped onto the guide means and are advanced by shifting one guide means or both, with the end faces toward the heating plate and, after removal of the heating plate, are pressed together with the softened end faces. A flash removal step follows this procedure, which is normally accomplished manually after the weld seam has cooled.

The conventional process and an apparatus for the welding together of synthetic resin profile elements are illustrated in FIGS. 1a, 1b, and 1c of the drawing wherein.

Figure 2:
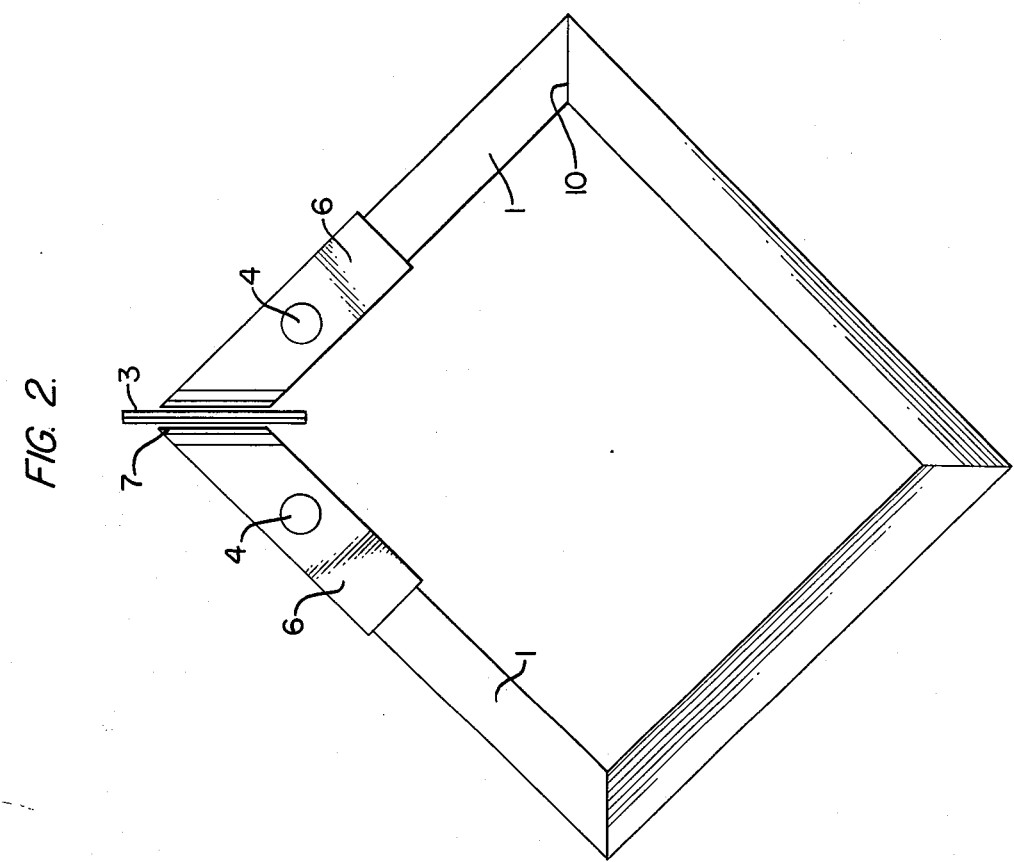

The schematically illustrated welding machine comprises two slides 2, which can either be both arranged to be shifted or one is fixed and the other is shifted. The profile elements 1 or structure in the form of sheets to be welded together at their end faces 10 are clamped onto the slides 2 with alignment at the stop 5 by means of the clamping units 4. After the profile elements 1 have been clamped into position, the heating plate 3 is moved in between the end faces of the profile elements 1, as illustrated in FIG. 1b. After the end faces 10 of the profile elements have started to melt, the heating plate 3 is lowered again, and the profile elements are pressed together under pressure. During the joining of the weld faces, the weld bead 8 is produced which exudes to the outside past the edges of the profile elements. Processes and devices are known for controlling the pressure to be exerted during the joining of the molten faces of the profile elements in order to obtain a satisfactory weld. However, all conventional processes have the problem of subsequently removing the thus-produced weld bead 8.

Figure 1A:
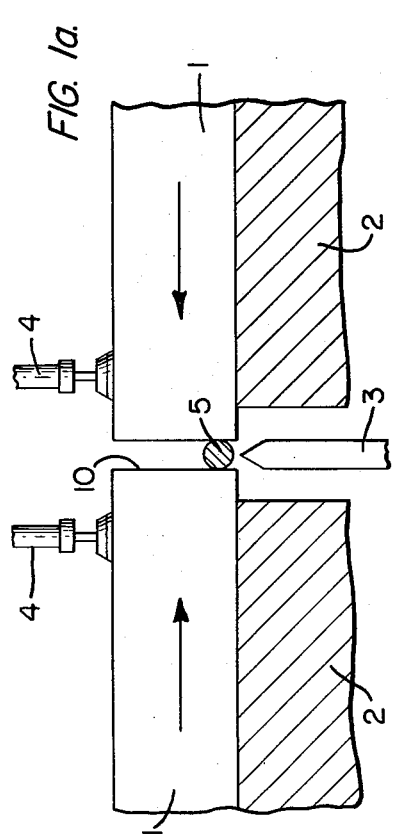
FIG. 1a is a schematic view in elevation of an apparatus with the profile elements aligned for welding.
Figure 1B:
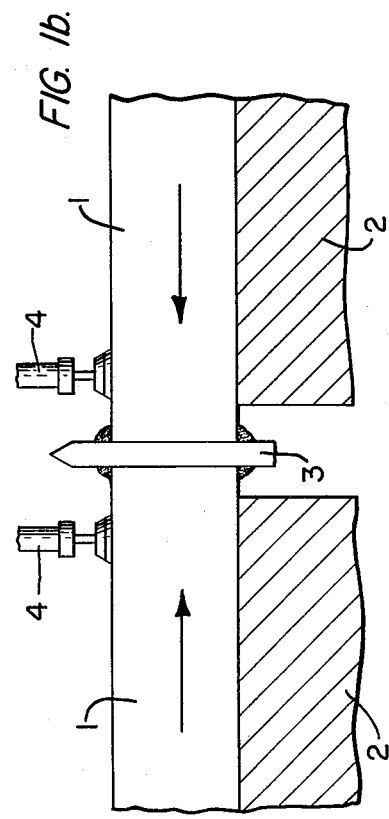
FIG. 1b shows the apparatus during melting of the elements.
Figure 1C:
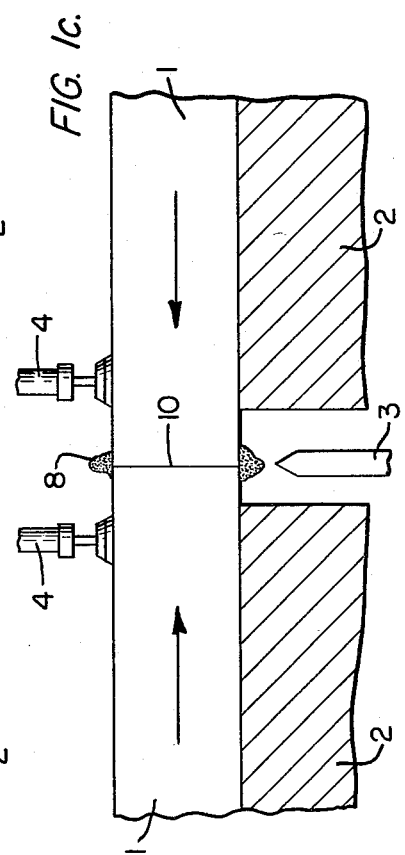
FIG. 1c shows the apparatus during welding of the elements.

With the use of an apparatus of the type illustrated in FIGS. 1a–1c, the weld bead can be trimmed off only after the weld bond has cooled, since, when the weld bead is machined off while the welded elements are still warm, there is the possibility of a deformation in the zone of the welded ends and, moreover, there is a subsequent shrinkage during the cooling process. This results in a contraction of the weld seam, so that the surface of the welded profile elements or resultant product in the zone of the welded edges is no longer planar. For this reason, the weld bead is basically machined off after the profile elements have cooled. This means either that longer waiting times must be tolerated in the operation of the welding machine in order to remove the weld bead while the profile members are still clamped in position, according to FIG. 1c, or a plurality of the welded-together profile elements must be aligned later on, for example to form a window frame or other assembly, in order to subsequently carry out the flash removal, for example, by means of abrasive belts. Furthermore, in case of a large weld bead, an additional polishing step for the surface from which the flash has been removed is also necessary, depending on the surface characteristic of the profile elements.

It is an object of the present invention to provide a process and apparatus for the welding together of synthetic resin structures such as profile elements in the form of sheet or the like, by means of which it is possible to limit the formation of the weld bead to a minimum space and simultaneously to effect the flash removal, i.e. the elimination of the weld bead, in the still warm condition of the just-welded profile elements.

The process according to this invention solves the above problems by providing that the profile elements are guided on at least two of the outside surfaces up to the welding edge, leaving the melting zone of each element vacant, and that the softened end faces of the profile elements are pressed together approximately until two opposing outside guiding means come in contact with each other, so that the weld bead formation is restricted and the weld bead can be scraped off while still in the warm condition. By the outside guidance of the profile element, for example within metallic rails, the melting zone is restricted in the zone of the welded edge to the required melting area, so that the weld bead can be formed only in the zone of the profile elements not engaged by the guide means. After the end faces of the profile elements have started to melt, the profile elements are pressed together and welded together exclusively in this defined zone. During the compression of the profile elements, the guide means approach each other until they are almost in contact with each other, and in this way a trimming of the weld bead is effected. The final removal of the weld bead then takes place in a further working step by means of a scraper or the like guided along the welded seam, wherein this flash removal step can be accomplished while the profile elements are still warm, since the guide means, in addition to conducting the heat away, also simultaneously ensure the dimensional stability of the profile elements in the welding zone.

The apparatus for conducting the process of this invention includes a welding machine for the welding together of and flash removal from synthetic resin profile elements, with a clamping unit, displaceable guide means, and a heating plate, wherein the profile elements to be welded together with their end faces are clamped onto the slides and are advanced toward the heating plate with their end faces, by shifting one guide means or both guide means and, after removal of the heating plate, are pressed together with their softened ends. According to the invention, a supplementary device is provided so that rails equipped with blades or other cutting means extending in parallel to the end face of the profile element are provided to clampingly engage the profile element; the profile element can be seized between these rails so that the blades are in contact with the profile element and extend up to the close proximity of the welding edge of each element.

The supplementary device of this invention can be attached to any commercial welding machine for the welding of synthetic resin profile elements, in order to thus conduct an essentially improved welding process and a more economical flash removal operation according to the process of this invention. However, in addition to achieving a more economical mode of operation, the weld quality of the thus-produced weld seam is substantially improved, since the bead formation during the melting step and during the welding step is restricted and the required welding pressure is enhanced by the external guidance of the rails.

The process of this invention and the associated apparatus are also usable for the welding together of coated profile elements wherein, for example, a cover layer of a different color is applied to a basic profile element. When using the conventional processes, it is impossible to attain an optically satisfactory weld seam in such coated profile elements, because the coating is displaced during the initial melting and the more so during the subsequent compression for welding purposes, due to the thus-produced weld bead. Consequently, after the weld bead has been machined away, a strip of an indefinable color remains in the weld zone, made up of a mixture of the colors of the basic profile element and of the coating. By restricting the weld bead in accordance with the process of the present invention, however, it is possible to weld together even such coated profile elements flawlessly with an over-all smooth transition in the zone of the welded edge, wherein the coating is not abraded away in the area of the welded edge.

In a further development of the supplementary device of this invention for a welding machine, it is suggested to manufacture the blades integrally with the rail, which can consist, for example, of a suitable steel, and to design the unit with wedge-shaped blade edges. However, in place of such solid, rigid rails with blade edges, it is also possible to provide the rail with a loose blade, fashioned as a thin leaf which is simultaneously resilient. Such a rail with a sprung knife blade is especially suitable for use in connection with profile elements which are not entirely planar, in order to compensate for unevennesses and to ensure the satisfactory guidance up into the welding zone. Moreover, it is advantageous to terminate the blades and the rails in a wedge shape so that the two rails meeting at the welding edge form an approximately V-shaped groove which forms simultaneously a guide groove for the scraper in a subsequent flash removing step.

The rails with blades according to the present invention can be fixedly joined to the slides or can also be displaceably mounted, depending on the type of the welding machine used. The same also holds true for the rail to be arranged between the clamping unit and the profile element, which rail can either be loosely placed thereon and fixed in position by means of a stop, or can be provided directly in structural unit with the clamping device.

Figure 2A:
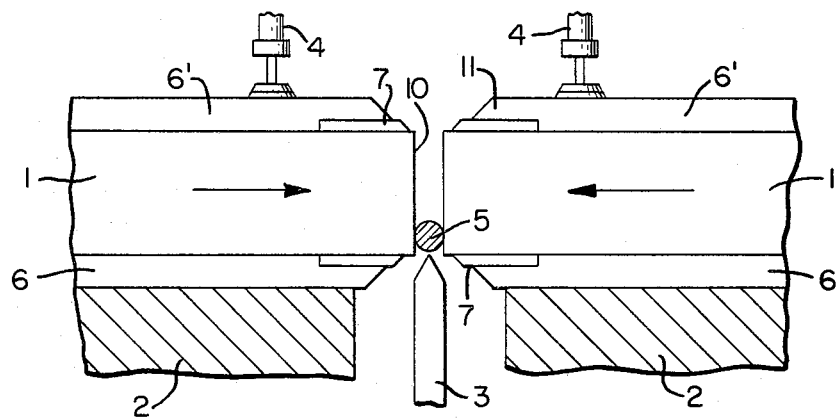
Figure 2B:
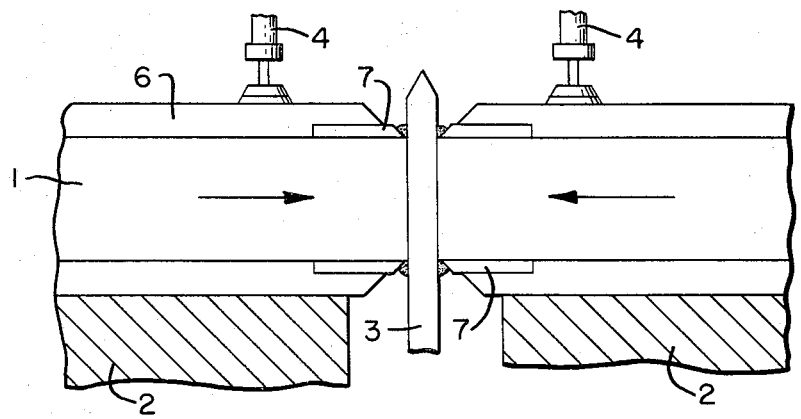
Figure 2C:
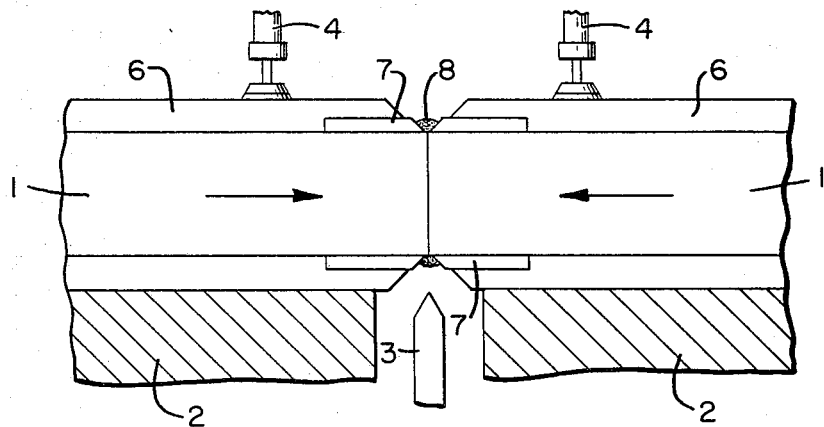
Figure 2D:
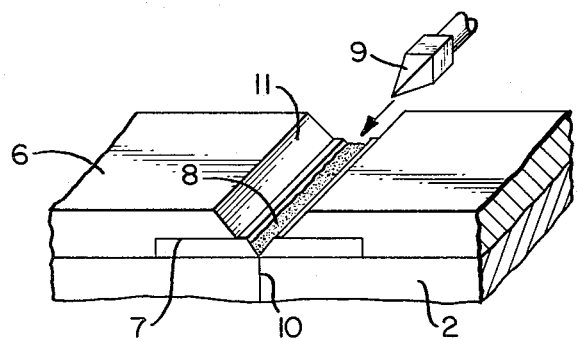

An embodiment of the invention will be explained in greater detail with reference to the accompanying drawings wherein:

FIG. 2 shows a schematic top view of a window frame made up of a plurality of synthetic resin profile elements;

FIG. 2a shows in elevation the apparatus of the invention during alignment of the profile elements;

FIG. 2b shows the apparatus of the invention during a melting step;

FIG. 2c shows the apparatus of the invention during a welding step;

FIG. 2d shows the apparatus of the invention during a flash removing step.

Figure 3:
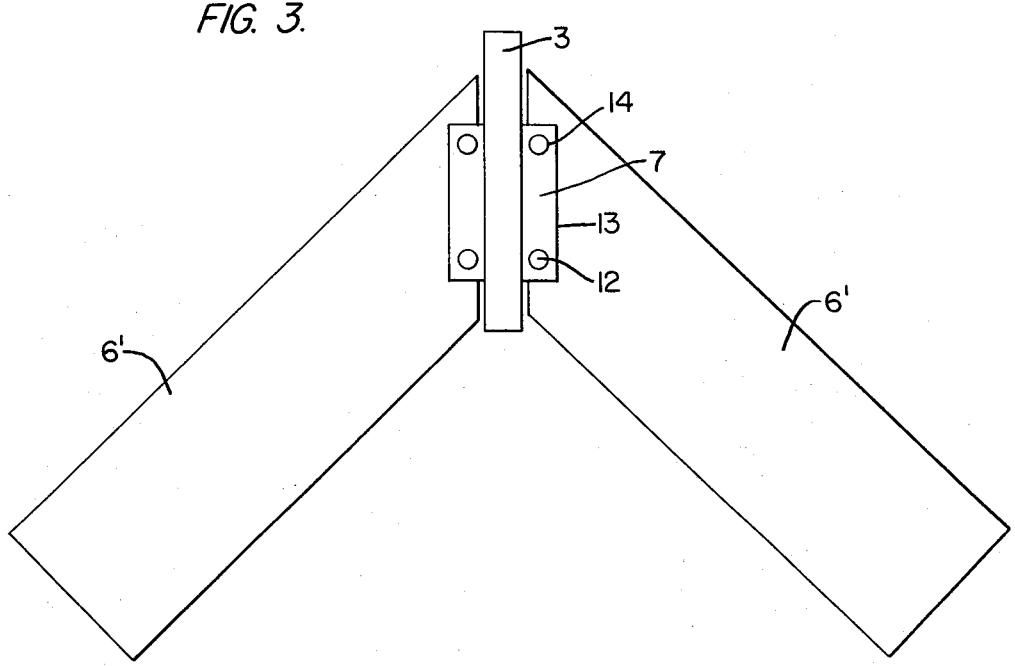
Figure 4:
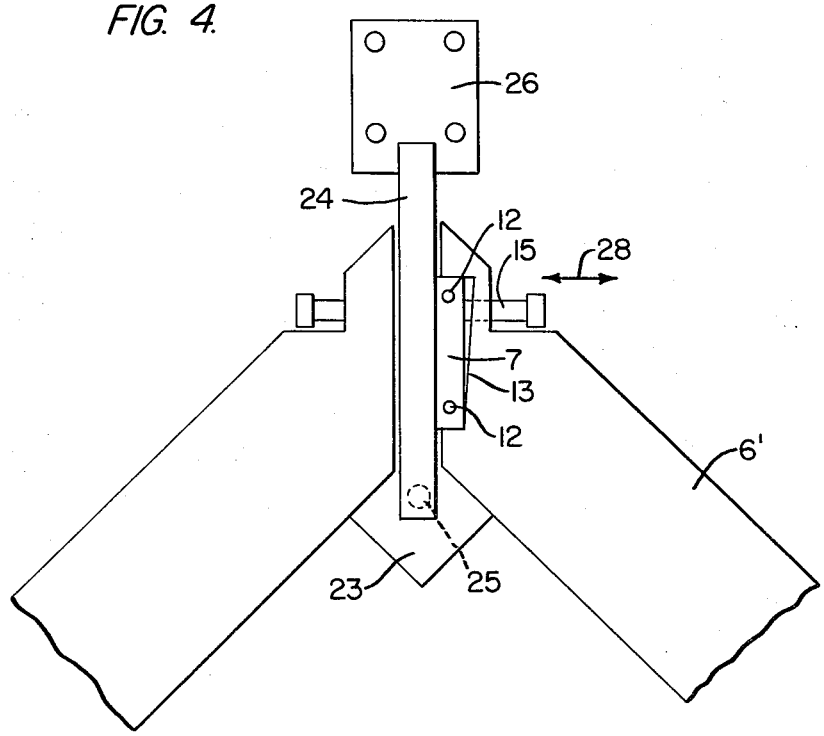

FIG. 3 shows a schematic bottom view of the upper guide rails of the inventive apparatus, FIG. 3 illustrating how the knife blades of the inventive apparatus are received in their respective rectangular recesses; and FIG. 4 is a view similar to FIG. 3 illustrating how the blades can be adjustably mounted on the guide rails.

In FIG. 2, the window frame is shown in a schematic top view composed of the profile elements 1 of a thermoplastic synthetic resin, i.e., polypropylene, which are already welded together at three edges 10. In the zone of the fourth corner to be welded together, the frame rests on the slide guides of the welding machine and is covered at the topside by the rails 6 and is held in position by the clamping units 4. In the region of the miter corner, the heating plate 3 is disposed, which can be moved vertically upwardly and downwardly.

The first process step to accomplish the welding together of the profile elements 1 along the end faces 10 is the alignment and clamping of the profile elements, illustrated in FIG. 2a. The welding machine comprises the guide means including slides 2, which are both displaceable, or which are arranged so that one is displaceable and the other is fixedly mounted. The rails 6 are fixedly mounted to the slides 2 or they are attached thereon to be displaced and fixed into position. The lower rails 6 include the blades 7 inserted at the end facing the welding edge of the profile element; these blades are beveled in a wedge-shaped manner, in a similar manner to the ends 11 of the rails. The profile elements 1 are placed on the rails 6 attached to the slides 2, aligned with respect to the stop 5, and clamped in position by means of the clamping unit 4 with the interposition of the upper rails 6' which also have blades 7 constructed analogously to the lower rails. The upper rails 6' can be joined to a structural unit with the clamping device; however, it is also possible to place the rails loosely on the profile element, and fix them in position by means of a stop or abutment mounted at the machine.

As illustrated in FIGS. 2a to 2c, profile elements 1 are held in position by being clamped between respective guide rails 6 and 6'. In order to facilitate insertion of new profile elements, guide rails 6 and 6' are not connected to one another. Rather guide rails 6 and 6' are either structurally (fixedly) joined to slide 2 and clamping unit 4, respectively, or unjoined in which case they are loosely arranged in place and fixed in position by means of suitable stops or abuttments as indicated above. For the insertion of new profile elements to be welded together, upper guide rail 6' is according to the invention lifted off either together with or separately from clamping unit 4, whereas lower guide rail 6 remains on slide 2. This way of fixing the profile elements to be welded together has the advantage that dimensional differences in the height of the profile elements can be compensated for in a simple manner. Furthermore, a specific pressure can be exerted by means of clamping unit 4 by way of guide rail 6' on profile element 1.

The profiles 1 are placed between the rails 6 and 6' so that, in the zone near the welding edges 10, only the end portions of the profile elements required to be melted to form the welding seam is outside of the rails. After the alignment and clamping of the profile elements 1, the stop 5 is retracted, and the heating blade 3, see FIG. 2b, is inserted between the profile elements 1. The melting of the profile elements 1 is restricted, by the rails 6 and 6' to the zones near the welding edges 10; this makes it possible for the first time to effect a controlled weld seam formation. After the end faces of the profile elements have been initially melted, the heating blade 3 is retracted, see FIG. 2c, and the profile elements are pressed together.

During the joining of the end faces of the profile elements, the path traversed by the meeting end faces and thus also the welding pressure are limited by the blades 7 of the rails 6 and 6'. As can be seen from FIG. 2c, each of the profile elements is disposed in the zone of the weld similarly as in a closed mold, so that deformation of the softened profile elements is impossible and a deforming exudate is produced only in the zone of the weld seam between the gap formed by the blades 7. The blades 7 prevent a spreading of the weld bead 8, since they trim off a portion of the weld bead as the blades are moved toward each other. The remaining portions of the bead, i.e. the flash, are then removed, as shown in FIG. 2d, by means of the scraper 9 which can be guided manually or mechanically.

The guidance of the scraper 9, which can either have a wedge shape, as shown in the figure, or can be of a round configuration, takes place between the wedge-shaped surfaces 11 of the rails 6. As can be seen from the process steps illustrated in FIGS. 2c and 2d, the flash removal of the weld bead is accomplished while the welded-together profile elements are still warm, wherein the flash removing operation is effected practically in two steps; namely, on the one hand, by the blades 7 of the rails 6 and, on the other hand, by the scraper 9. This, therefore, means that the flash removal takes place by means of two movements lying in one plane and being at right angles to each other, namely, on the one hand in the direction towards the welding seam and, on the other hand, at right angles thereto.

In accordance with the preferred embodiment of the present invention, blades 7 are detachably mounted on guide rails 6 and 6' so that the blades can be removed and sharpened when they become dull. As shown in FIG. 3, blades 7 can be detachably mounted in rectangular recesses 13 of upper guide rail 6' by means of pins or screws 12 which are received in holes 14 of blades 7. If screws are used to secure blades 7 in place, simple tightening of the screws will rigidly fix the blades in position. If pins rather than screws are used to fix blades 7 in place, contructing pins 12 and holes 14 so as to insure a tight fit therebetween will insure that the knife blades are held in position.

In accordance with an especially preferred embodiment of the present invention, blades 7 are mounted on guide rails 6 and 6' so that the position of blades 7 is adjustable. As shown in FIG. 4, fine setting and precise adjustment of the gap between the blade edges of knife blades 7 is effected by shifting knife blades 7 in the direction of arrow 28, this shifting being accomplished by means of set screw 15. Knife blades 7 are disposed in recesses 13 of guide rails 6' and fixed into position by means of pins or screws 12. In order to adjust the position of knife blades 7, screws 12 must be loosened somewhat so that the blades may be moved. If the knife blades are held in position by means of pins 12 (rather than screws) the pins themselves can be movably mounted on the guide rails, the position of the pins being controlled by set screw 15.

As an adjunct of the adjustment of the position of blades 7, adjustment plate 24 with retaining pins 25 is set in the miter gap, retaining pins 25 being received in bearing block 23. On the opposite side of adjusting plate 24 is a bearing 26 for adjusting the position of adjusting plate 24. When it becomes necessary to readjust the position of knife blades 7 or substitute a new knife blade 7 for a dull knife blade, adjustment plate 24 is placed in the miter gap and the blades to be repositioned are directed against it by means of said screw 12.

By means of the process and apparatus of the present invention, it is not only possible to butt-weld miter joints, as illustrated in the example of FIG. 2, but also T-joints and other seam configurations. The thus-produced weld seams have a high weld quality, due to the restriction of the bead formation during the melting and welding steps and the associated controlled welding pressures. When the process is applied to coated profile elements, an intermixing of the different colors in the welding zone is avoided by the feature that the profile element is held down by the rails 6 and 6', so that a flawless welded surface is produced which has no color variations whatever. Moreover, the process of the present invention, with the utilization of the associated device, proves to be economical, since waiting times, until the welded profile elements have cooled down in order to be able to execute the flash removal operation, are avoided.

It will be appreciated from the detailed description of the embodiment of the invention in the drawings that when two plastic profile elements are welded together, a weld bead which extends all around is, of course, produced. Depending on the purpose for which the welded-together profile elements are to be used, it may be necessary to remove the weld beads on all sides, or only on one, two, or three sides. The apparatus of the present invention is also suitable for engaging several sides of a profile element. However, the prerequisite therefor is that a planar surface is involved in each case.

A particularly suitable field of application for the present invention is the welding of window profiles and/or door profiles. These profile elements are distinguished in that they have a smooth face on two opposite sides, namely the outside of the window and the inside of the window. For this reason, the embodiment of the invention shown is utilized in connection with these two face areas, while the other two edges, since they are disposed within the frame and covered during the subsequent installation, are not subjected to such a treatment. However, the apparatus of this invention can be utilized on all smooth surfaces of a profile element, as required.

Furthermore, it will also be understood that a suitable material for the profile elements to be welded with the device of the present invention can be all weldable thermoplastic synthetic materials, such as, for example, polyvinyl chloride, polypropylene, etc. These elements can be colored or can have a colored layer of thermoplastic on the surfaces to be exposed.

The welding pressure when the two ends to be bonded together are brought into contact is dependent, on the one hand, on the material and, on the other hand, also on the size of the profile elements. This pressure ranges preferably between 2 atmospheres gauge and 4 atmospheres gauge. In case of window profiles, the pressure will be approximately 3 atmospheres gauge.

It will also be recognized that this invention is directed, on the one hand, to a procedure of the problem of removing the weld bead produced during the butt welding of the thermoplastic profile elements, and, on the other hand, to the procedure for limiting the formation of the weld bead proper to a minimum space. In this way, the quality of the welding bond and the surface quality of the thus-produced weld seam is essentially improved over heretofore known processes. This is of importance, in particular, if coated profiles are to be welded together, where on a base profile a cover layer is applied which is of a different color and in most cases is very thin, having a thickness of only a few tenths of a millimeter.

It is possible, by means of the present invention, to produce a weld seam whereby also coated profile elements are worked flawlessly so that a continuous, smooth cover coat is retained even in the zone of the weld seam, and the layer is not worked away in the area of the welding edge during welding and during the production of the weld bead. No thin separating layer having the color of the base member is formed, either. This result is obtained according to the invention by keeping the profiles on the outside at least partially in contact with guide rails, and by providing that the weld bead formation is limited by guide rails extending on the outside up to the welding edge, leaving merely the melting zone free. The thus-produced residual weld bead is scraped off, while the profiles held in the guide rails are still in the warm condition, in the miter direction.

Thus, by means of the present invention, the weld bead formation is already limited during the initial melting and during the welding step, by the feature that the applied external guide rails do not only prevent the further transmission of heat, but the welding pressure is also increased by the external guidance. The final removal of the weld bead takes place in a further working step by means of a scraper guided along the welding edge, the removal of the welding flash being conducted while the profile elements held by the guide rails are still in the warm condition. The guide rails ensure, during this flash removal step, in addition to effecting a heat removal, also the dimensional stability of the profile elements in the welding zone.

As previously indicated knife blades 7 are preferably (although not necessarily) slightly resilient in nature, the slight resilience serving to accommodate slight dimensional variations in the profile elements to be welded. Advantageously, knife blades 7 can be made from any conventional blade-forming material. When constructed in this way, knife blade 7 will have the desired resiliency characteristics.

While the novel embodiments of the invention have been described, it will be understood that various omissions, modifications and changes in these embodiments may be made by one skilled in the art without departing from the spirit and scope of the invention.

What is claimed is:

1. In a process for welding end faces of synthetic resin profile elements together, wherein in step (a) the end faces of the profile elements to be welded together are heated by being brought into contact with a heating plate until initial melting occurs; in step (b) the heating plate is removed from between the end faces and the softened end faces are pressed together to form a weld seam and in step (c) a weld bead formed when said end faces are pressed together is removed, the improvement wherein during steps (a) and (b) each profile element is positioned between and guided by at least two wedge-like converging guide rail means that engage the profile element on at least two opposing outside surfaces thereof, each guide rail means including a leading edge that is parallel to and spaced from the end faces of the profile elements to be welded whereby a melting zone is left vacant and the weld bead formation is restricted to a minimum space so that the weld bead formation can be removed in step (c) while said profile elements are still in the warm condition; the end faces of said profile elements are pressed together in step (b) until the leading edges of the guide rail means almost contact one another whereby a portion of the weld bead formation is trimmed off and during step (c) the remaining portion of the weld bead formation is removed while said profile elements are positioned between said guide rail means by moving a scraper means transversely across the leading edges of said guide rail means while the profile elements are still in the warm condition.

2. The process of claim 1, wherein said leading edges together define a laterally limited mold space when said profile elements are pressed together.

3. The process of claim 1, wherein said leading edges and respective guide rail means form transversely-extending V-shaped notches when said profile elements are pressed together, a weld bead being formed in said V-shaped notches when said profile elements are pressed together, and the weld beads being scraped-off by movement of the scraper means through said V-shaped notches.

4. In an auxiliary apparatus for a welding machine for welding together and for removal of a weld bead formation of synthetic resin profile elements, wherein said auxiliary apparatus includes a heating plate, and displaceable guide means at least partially encompassing the profile elements and extending into close proximity to the end faces of the profile elements to be welded together, said guide means being displaceable relative to one another such that the end faces of the profile elements to be welded are contacted with said heating plate to effect melting thereof, the heating plate is moved from between the end faces and the guide means are further displaced to compress the profile elements together to cause the formation of a weld seam and a weld bead, the improvement wherein each guide means comprises at least two wedge-shaped converging guide rails for engaging the profile elements on at least two opposing outside surfaces thereof, each guide rail including a leading edge that is parallel to and spaced from the end faces of the profile elements to be welded whereby a welding zone is left vacant and the welding bead formation is restricted to a minimum space during contact with said heating plate and compression of said profile elements whereby the weld bead formation can be removed while said profile elements are still in the warm condition; the guide means engaging each profile element being displaceable towards each other to press the end faces of said profile elements together until the leading edges of the guide rails almost contact one another and a portion of the weld bead formation is trimmed off and said guide means being maintained at a stationary position while the remaining portion of the weld bead formation is removed by a scraper which is movable transversely across the leading edges of said guide rails.

5. The apparatus of claim 4, wherein the wedge-like converging guide rails encompassing each profile element and the leading edges of each rail together define a V-shaped groove when said converging guide rails encompassing each profile element are displaced towards each other, said scraper means scraping off the weld bead formed in said V-shaped groove.

6. The apparatus of claim 4, wherein each guide rail terminates at its associated leading edge in a wedge-shaped configuration.

7. The apparatus of claim 4, wherein said guide rails are arranged so that said profile elements when welded together form a miter joint.

8. The apparatus of claim 7, wherein guide rails engaging the same profile elements are unattached to one another.

9. The apparatus of claim 8 further comprising a plurality of slide means, at least one guide rail engaging each profile element being mounted on a respective slide means.

10. The apparatus of claim 9 further comprising a plurality of clamping means, one clamping means associated with each of said slide means.

11. The apparatus of claim 4, wherein the improvement further comprises a resilient knife blade attached to each guide rail and providing the leading edge thereof, each knife blade being carried in a recess of the respective guide rails.

12. The apparatus of claim 11, wherein each knife blade is fixedly mounted on the respective guide rail, said apparatus further comprising means for adjusting the position of each knife blade on the respective guide rail.

13. The apparatus of claim 11, wherein said guide rails and said knife blades are metallic.

14. The apparatus of claim 11, wherein each knife blade is fixedly mounted on the respective guide rail.

15. The apparatus of claim 14, wherein said knife blades are resilient.

16. The apparatus of claim 15, wherein guide rails engaging the same profile elements are unattached to one another.

17. In an auxiliary apparatus for a welding machine for welding together and for removal of a weld bead formation of synthetic resin profile elements, wherein said auxiliary apparatus includes a heating plate, and displaceable guide means at least partially encompassing the profile elements and extending into close proximity to the end faces of the profile elements to be welded together, said guide means being displaceable relative to one another such that the end faces of the profile elements to be welded are contacted with said heating plate to effect melting thereof, the heating plate is moved from between the end faces and the guide means are further displaced to compress the profile elements together to cause the formation of a weld seam and a weld bead, the improvement wherein each guide means comprises at least two wedge-shaped converging guide rails for engaging the profile elements on at least two opposing outside surfaces thereof, each guide rail including a knife blade attached to each guide rail and providing the leading edge thereof, each knife blade being carried in a recess of the respective guide rails that each knife blade is parallel to and spaced from the end faces of the profile elements to be welded whereby a welding zone is left vacant and the welding bead formation is restricted to a minimum space during contact with said heating plate and compression of said profile elements whereby the weld bead formation can be removed while said profile elements are still in the warm condition, the guide means being displaceable towards each other to press the end faces of said profile elements together until the edges of the knife blades almost contact one another and a portion of the weld bead formation is trimmed off and means for scraping off any remaining portion of said weld bead formation.

18. A process for welding end faces of synthetic resin coated profile elements together, said profile elements being coated with a cover layer of thermoplastic material, wherein in step (a) the end faces of the profile elements to be welded together are heated by being brought into contact with a heating plate until initial melting occurs; in step (b) the heating plate is removed from between the end faces and the softened end faces are pressed together to form a weld seam and in step (c) a weld bead formed when said end faces are pressed together is removed, and wherein during steps (a) and (b) each profile element is positioned between and guided by at least two wedge-like converging guide rail means that engage the profile element on at least two opposing outside surfaces thereof with the cover layer of each element being positioned to meet at the weld seam, each guide rail means including a leading edge that is parallel to and spaced from the end faces of the profile elements to be welded whereby a melting zone is left vacant and the weld bead formation is restricted to a minimum space so that the weld bead formation can be removed in step (c) while said profile elements are still in the warm condition; the end faces of said profile elements are pressed together in step (b) until the leading edges of the guide rail means almost contact one another whereby a portion of the weld bead formation is trimmed off and in step (c) the remaining portion of the weld bead formation is removed while said profile elements are positioned between said guide rail means by moving a scraper means transversely across the leading edges of said guide rail means while the profile elements are still in the warm condition whereby the cover layers are welded together to provide a continuous coating in the zone of the weld seam.

19. The process of claim 18, wherein the cover layer is a colored layer.

20. An auxiliary apparatus for a welding machine for welding together and for removal of a weld bead formation of synthetic resin profile elements coated with a cover layer of thermoplastic material, wherein said auxiliary apparatus includes a heating plate, and displaceable guide means at least partially encompassing the profile elements and extending into close proximity to the end faces of the profile elements to be welded together, said guide means being displaceable relative to one another such that the end faces of the profile elements to be welded are contacted with said heating plate to effect melting thereof, the heating plate is moved from between the end faces and the guide means are further displaced to compress the profile elements together to cause the formation of a weld seam and a weld bead, and wherein each guide means comprises at least two wedge-shaped converging guide rails for engaging the profile elements on at least two opposing outside surfaces thereof, each guide rail including a leading edge that is parallel to and spaced from the end faces of the profile elements to be welded whereby a welding zone is left vacant and the welding bead formation is restricted to a minimum space by the external guide rails preventing further transmission of heat and compression of said profile elements so that the weld bead formation can be removed while said profile elements are still in the warm condition; the guide means being displaceable towards each other to press the end faces of said profile elements together until the leading edges of the guide rails almost contact one another and a portion of the weld bead formation is trimmed off and said guide means being maintained at a stationary position while the remaining portion of the weld bead formation is removed by a scraper means while said profile elements are positioned in the warm condition between said guide means whereby said cover layers provide a continuous coating in the zone of the weld seam.

21. The apparatus of claim 20, wherein said scraper means for removing the remaining portion of the weld bead formation is a scraper which is moveable transversely across the leading edges of said guide rails.

22. The apparatus of claim 20, wherein the cover layer is a colored layer.

* * * * *